United States Patent
Lahcanski et al.

(10) Patent No.: US 7,945,734 B2
(45) Date of Patent: May 17, 2011

(54) REMOVABLE STORAGE DEVICE WITH CODE TO ALLOW CHANGE DETECTION

(75) Inventors: Tomi Lahcanski, Rochester, NY (US); Joseph P. Lentz, Kendall, NY (US); Jay A. Endsley, Durham, NC (US)

(73) Assignee: Eastman Kodak Company, Rochester, NY (US)

( * ) Notice: Subject to any disclaimer, the term of this patent is extended or adjusted under 35 U.S.C. 154(b) by 489 days.

(21) Appl. No.: 11/836,812

(22) Filed: Aug. 10, 2007

(65) Prior Publication Data

US 2009/0043963 A1 Feb. 12, 2009

(51) Int. Cl.
*G06F 17/30* (2006.01)
(52) U.S. Cl. ........................................ 711/115
(58) Field of Classification Search ................. None
See application file for complete search history.

(56) References Cited

U.S. PATENT DOCUMENTS

| | | | |
|---|---|---|---|
| 4,908,861 A | | 3/1990 | Brachtl et al. |
| 5,828,876 A | * | 10/1998 | Fish et al. ............... 1/1 |
| 6,862,604 B1 | | 3/2005 | Spencer et al. |
| 2005/0193170 A1 | | 9/2005 | Endo |
| 2006/0200599 A1 | * | 9/2006 | Manchester et al. ......... 710/62 |
| 2007/0156778 A1 | * | 7/2007 | Archer et al. ............. 707/201 |
| 2007/0208818 A1 | * | 9/2007 | Manders ................ 709/208 |
| 2008/0170694 A1 | * | 7/2008 | Ryan et al. .............. 380/277 |

OTHER PUBLICATIONS

"Processor-embedded distributed smart disks for I/O-intensive workloads: architectures, performance models and evaluation" by Steve C. Chiu et al., Journal of Parallel and Distributed Computing, Elsevier, Amsterdam, NL, vol. 65, No. 4, Apr. 1, 2005, pp. 532-551, XP004797723.

"Virtual-machine-based intrusion detection on file-aware block level storage", by Youhui Zhang et al., Computer Architecture and High Performance Computing, 2006. SBAC-PAD & APOS; 06. 18th International Symposium on, IEEE, PI, Oct. 1, 2006, pp. 185-192, XP031031913.

* cited by examiner

*Primary Examiner* — Duc T Doan
(74) *Attorney, Agent, or Firm* — Peyton C. Watkins (57) ABSTRACT

A system that provides rapid detection of modifications to content on a removable storage device. The system includes a removable storage device having a code for indicating that modifications were made to the content on the removable storage device. The system also includes a media processor for reading the code of the removable storage device, comparing the code to a previously stored code in a memory, and mounting a pre-established file system database structure for the removable storage device when the value of the code of the removable storage device equals the value of the previously stored code.

29 Claims, 7 Drawing Sheets

REMOVABLE STORAGE DEVICE WITH CODE TO ALLOW CHANGE DETECTION

FIELD OF THE INVENTION

The present invention relates generally to media processing systems and, more particularly, to memory cards and other types of removable storage devices for use with a processing device of a media processing system.

BACKGROUND OF THE INVENTION

Many media processing devices are configured to utilize memory cards or other types of removable storage devices, including microdrives, where the term microdrive refers to removable storage devices utilizing either rotating magnetic media, such as a hard disc drive (HDD), or rotating optical media. Flash drives, having a universal serial bus (USB) connector, are another type of removable solid-state memory device in common use for storage of media files.

In an exemplary application, a digital camera such as model V610, manufactured by Eastman Kodak Company, Rochester, N.Y., includes a memory card slot adapted for insertion of a memory card that may include, for example, Secure Digital (SD) or Multimedia Card (MMC). Digital images captured by the digital camera are stored in the memory card. The memory card can then be removed from the digital camera and inserted into a memory card slot associated with another processing device such as a personal computer, such that the other processing device can be used to view, print, archive, email, upload, transmit or otherwise process the images stored on the memory card.

In another exemplary application, a portable music player such as model LDP-200, manufactured by Lexar Media, Inc., Fremont, Calif., includes a memory card slot adapted for insertion of an SD card. Music files (MP3, WAV, etc.) that have been saved to the SD card by another processing device, such as a personal computer, can be played back by the portable music player.

Prior to accessing any of the contents of the removable storage device, the processing device must first scan the storage device to determine its contents. This operation typically takes place during power-on of the processing device or immediately following insertion of a removable storage device into the powered-on processing device. The results of this scan are then temporarily cached in the processing device's internal memory as a file system database structure for the removable storage device and the procedure is often referred to as mounting the file system. This cached file system then permits quick access to any of the removable storage device's files by the processing device.

Unfortunately, this process currently needs to be repeated each time that the media-processing device is powered on or each time that a removable storage device is inserted into the powered-on processing device. As the capacity of removable storage devices continues to increase, the time required to mount their associated file systems also increases, with a corresponding negative impact on the consumer's user experience with the processing device.

U.S. Pat. No. 6,862,604 discloses a method involving the generation and maintenance of a file usage data structure by the memory card controller. The file usage data structure is resident on the memory card itself and is updated by the memory card controller following each file change operation such as writing a new file to the card or modifying or deleting an existing file. The memory card controller is configured to report the contents of the file usage data structure to the processing device when requested. The method taught by this disclosure suffers from at least two drawbacks. First, it imposes the use of a predetermined file usage data structure, thereby limiting implementation flexibility by processing device manufacturers. Second, it fails to provide a simple method to allow a processing device to quickly determine whether or not the contents of the storage device have changed since the last time it was used by a particular processing device.

Therefore, a need exists for a means to enable a processing device, that is operably connected to a removable storage device, to quickly and easily determine whether or not the contents of the removable storage device were changed since it was last used by the processing device. The availability of such a means would enable the processing device to instantly mount the file system of the removable storage device in the event that no changes were made to the contents of the removable storage device since it was last used by the processing device.

SUMMARY OF THE INVENTION

In general terms, the present disclosure relates to a system and method for media processing, and more particularly to rapidly detecting that modifications were made to content on a removable storage device.

One aspect of the present invention is a system for rapid detection of modifications made to content on a removable storage device. The system includes a removable storage device having a code for indicating that a modification was made to content on the removable storage device, and a media processor for reading the code of the removable storage device and comparing the code to a previously stored code in a memory, and mounting a pre-established file system database structure for the removable storage device when the value of the code of the removable storage device equals the value of the previously stored code.

Another aspect of the present invention is a method for rapidly detecting modifications to content on a removable storage device. The method includes reading a code from a removable storage device by a media processor and comparing the code to a previously stored code in a memory for indicating a modification to the content on the removable storage device, and mounting a pre-established file system database structure for the removable storage device when the value of the code of the removable storage device equals the value of the previously stored code.

Another aspect of the present invention is a removable storage device. The device includes a controller, non-volatile memory, and a code stored in non-volatile memory that is updated by the controller for indicating that modifications have been made to content in file memory.

DETAILED DESCRIPTION OF THE INVENTION

The present invention will be illustrated herein in conjunction with particular embodiments of media processing systems, removable storage devices and other elements. It should be understood, however, that these illustrative arrangements are presented by way of example only, and should not be viewed as limiting the scope of the invention in any way. Those skilled in the art will recognize that the disclosed techniques can be adapted in a straightforward manner for use with a wide variety of other media processing systems, processing devices, removable storage devices, etc.

Figure 1A:
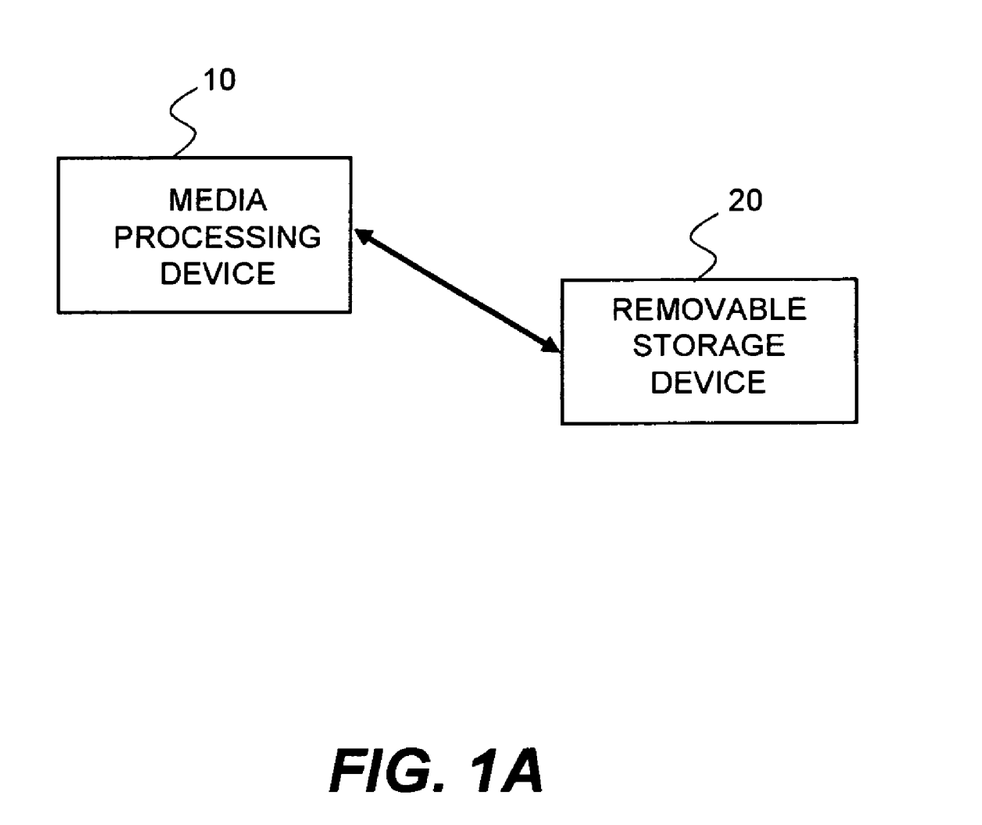
FIG. 1A illustrates a block diagram of media processing system including a processing device and a shared, removable storage device.

FIG. 1A is a block diagram of media processing system including a processing device 10 and a shared, removable storage device 20. The term media includes, but is not limited to, digital still images, digital videos, documents, maps, music and games. The illustrated media processing device 10 can be any media processor, as will be described in more detail below. The removable storage device 20 can include, but is not limited to, solid-state devices such as memory cards or flash drives as well as micro-drive devices utilizing either rotating magnetic or optical storage media. Media file types may include still images, videos, music, games, GPS maps, documents, etc.

Figure 1B:
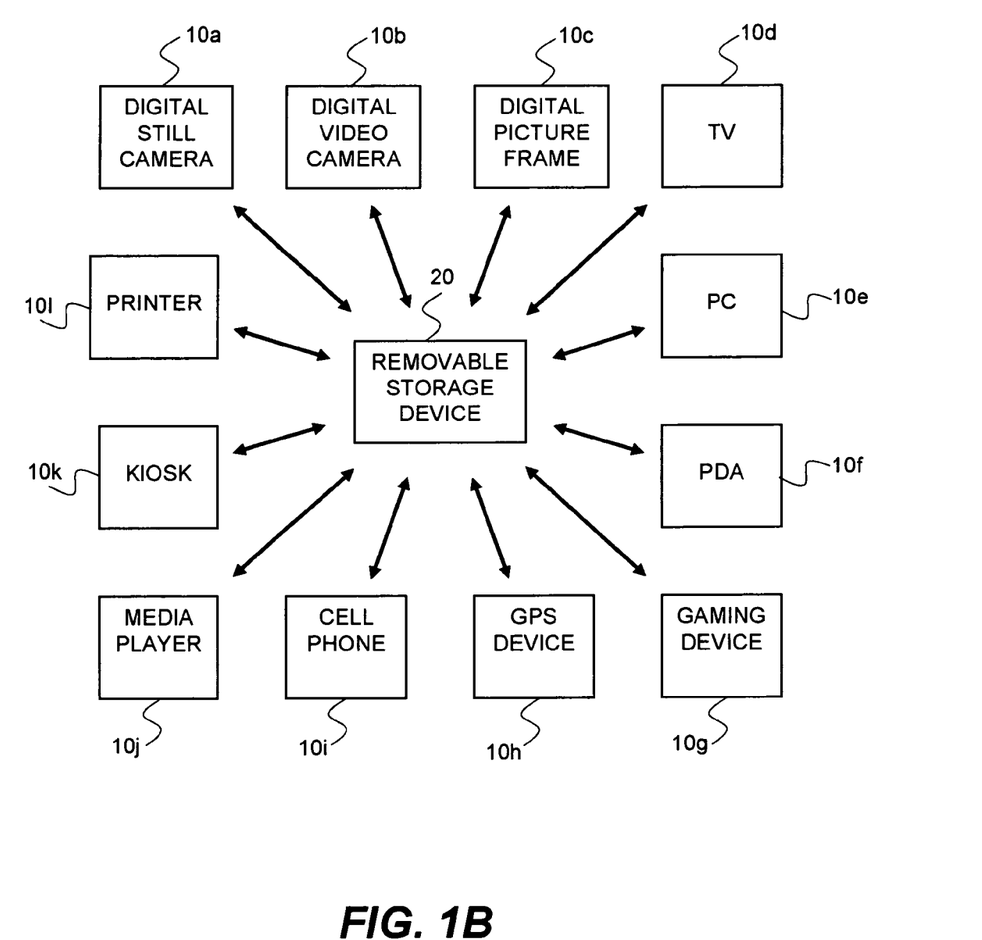
FIG. 1B illustrates a block diagram of media processing system including a plurality of processing devices and a shared, removable storage device.

FIG. 1B illustrates one embodiment of a media processing system including various types of media processing devices 10a-1 and a removable storage device 20 that can be shared among any of the media processing devices 10a-1. The media processing devices 10a-1 are coupled to the removable storage device 20 by, for example, inserting the removable storage device 20 into one of the media processing devices 10a-1. However, the embodiment is not limited to inserting the removable storage device 20 into one of the media processing devices 10a-1, and any suitable connection can be made between the devices 10a-1, 20. The illustrated media processing devices 10a-1 include, but are not limited to, digital still cameras 10a, digital video cameras 10b, digital picture frames 10c, televisions 10d, personal computers (PCs) 10e, personal digital assistants (PDAs) 10f, gaming devices 10g, global positioning system (GPS) devices 10h, cell phones 10i, portable media players 10j, kiosks 10k, and printers 10l.

Figure 2:
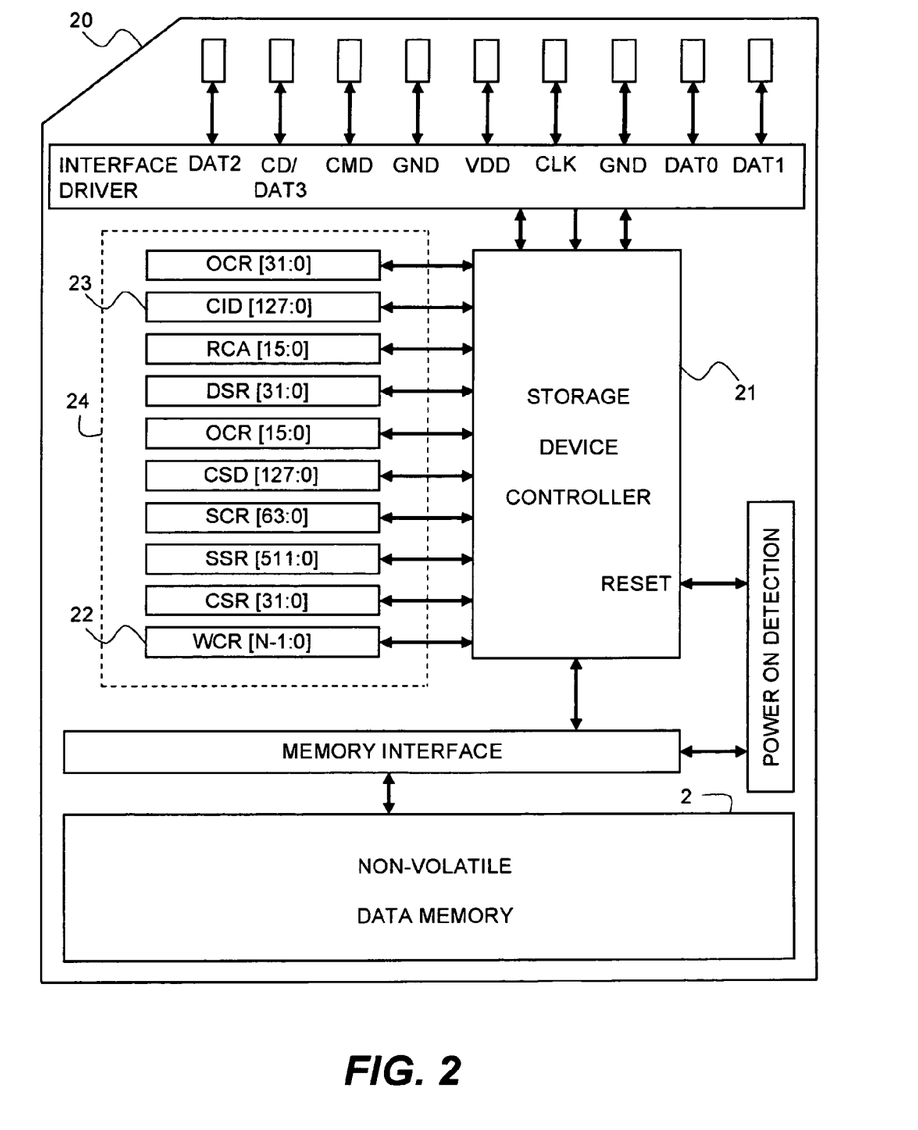
FIG. 2 is an exemplary functional block diagram of a solid-state removable storage device.

FIG. 2 illustrates a functional block diagram of an exemplary solid-state removable storage device 20 as substantially described in FIG. 3-12 of the SD Specifications, Part 1, Physical Layer Specification, Version 2.00, dated May 9, 2006 and published by the SD Card Association. This figure will serve as a basis for a description of the various embodiments of the present invention but is not intended to limit the scope of the invention to removable storage devices 20 having this particular functional architecture. The removable storage device 20 comprises at least a storage device controller 21, a non-volatile data memory 25, i.e., file memory, and a set of non-volatile registers 24 that may include at least a write code register (WCR) 22 and a card identification register (CID) 23. The N-bit write code register 22 contains one or more codes, each comprising M-bits of binary information (where M is less than or equal to N), located either contiguously or non-contiguously within the non-volatile register 24 memory space belonging to the storage device controller 21. Alternatively, the one or more codes may occupy one or more contiguous or non-contiguous portions of the non-volatile data memory space 25 of the storage device 20 which may be functionally partitioned into a plurality of memory partitions or memory segments. The card identification register 23 includes at least a manufacturer code and a serial number which together uniquely identifies the card from all others.

Figure 3:
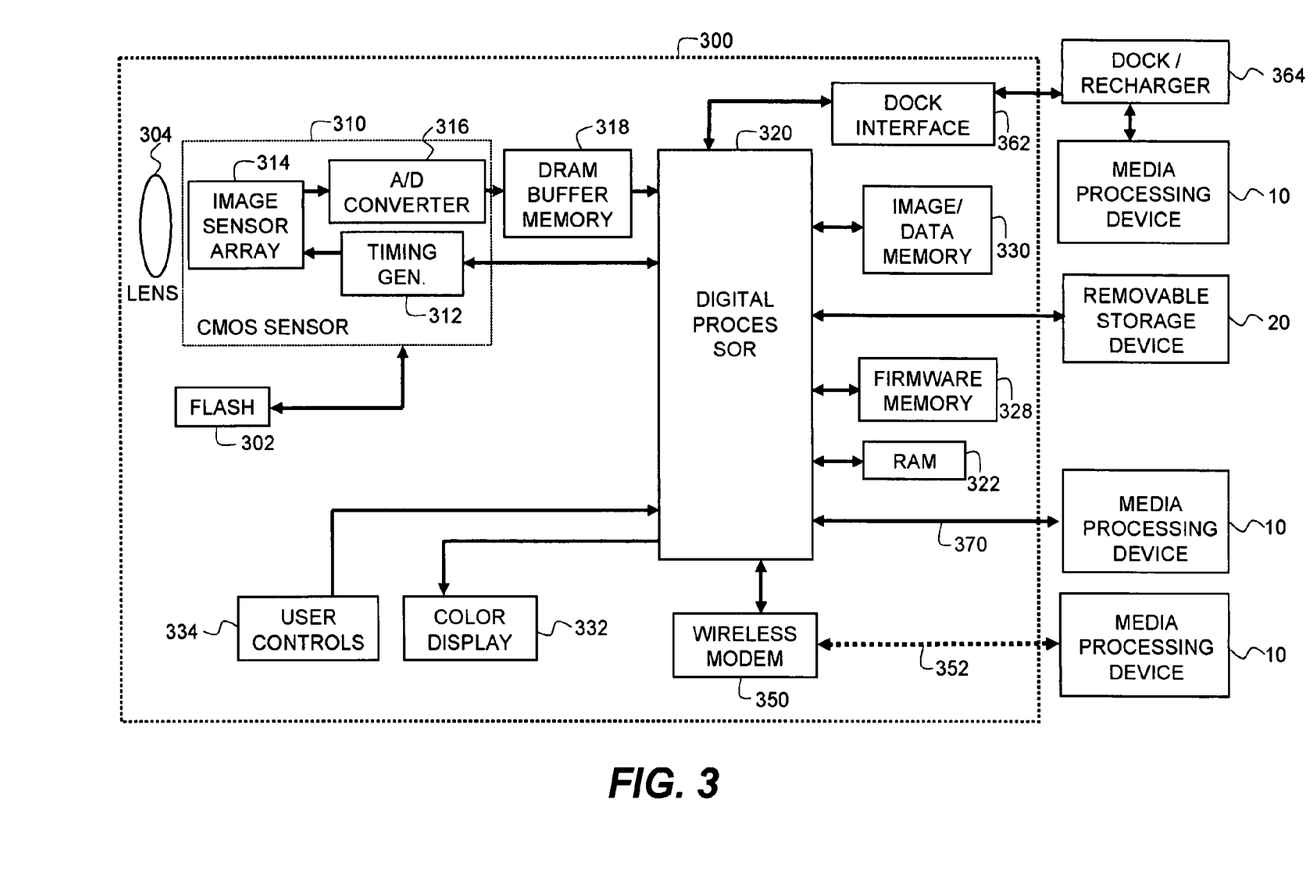
FIG. 3 is an exemplary functional block diagram of a digital still camera, representative of one type of media processing device.

FIG. 3 illustrates an exemplary functional block diagram of a digital still camera 300 as representative of one type of media processing device 10 in FIG. 1. The DSC 300 comprises a lens 304 for receiving image-wise light from a scene and focusing it onto a CMOS imager 310. CMOS imager 310 comprises at least a two-dimensional image sensor array 314 for receiving focused image-wise light from the lens 304 and converting each pixel of focused image-wise light into a corresponding electrical signal, an analog-to-digital (A/D) converter 316 for converting the electrical signal from each pixel into a digital code representative of the magnitude of the pixel signal and a timing generator 312 for controlling the operation of the CMOS imager. A non-volatile Flash memory 302 contains various setup parameters required by the CMOS imager 310. Raw digital image data from the CMOS imager 310 is sent to a DRAM buffer memory 318 at a video rate for subsequent processing by the DSC's digital processor 320 in response to user commands entered via the user controls 330.

A digital processor 320 processes raw image data from DRAM buffer 318 according to algorithmic instructions contained in an internal non-volatile firmware memory 328, with intermediate results saved in RAM 322. Processing may include, for example, color filter array (CFA) interpolation to produce at least three complete color planes from the CFA color samples, correction for defective pixels within the imager 310, color and tone-scale correction for the intended display device and sharpening of the image details. Processed images may then be stored in non-volatile image/data memory 330 or on removable storage device 20. Images may be compressed using the popular JPEG image format and saved using a file format such as EXIF, for example. Live or saved images may be viewed on an internal color display 332 and may also be shared between other processing devices 10 via a wireless modem 350 using a wireless link 352 such as that described, for example, in one or more of the IEEE 802.11 family of standards. Images may also be shared between the DSC 300 and other processing devices 10 via a dock interface 362 to a companion dock/recharger 364 that is operably connected to another processing device 10 such as a personal computer. Images may also be shared between the DSC 300 and other processing devices 10 via a wired connection 370 such as a universal serial bus (USB), for example. The storing, saving, viewing and the like can be controlled by user controls 334 coupled to the processor 320. However, the invention is not limited to user controls 334 being coupled to the processor 320 and any suitable controls can be used.

Figure 4:
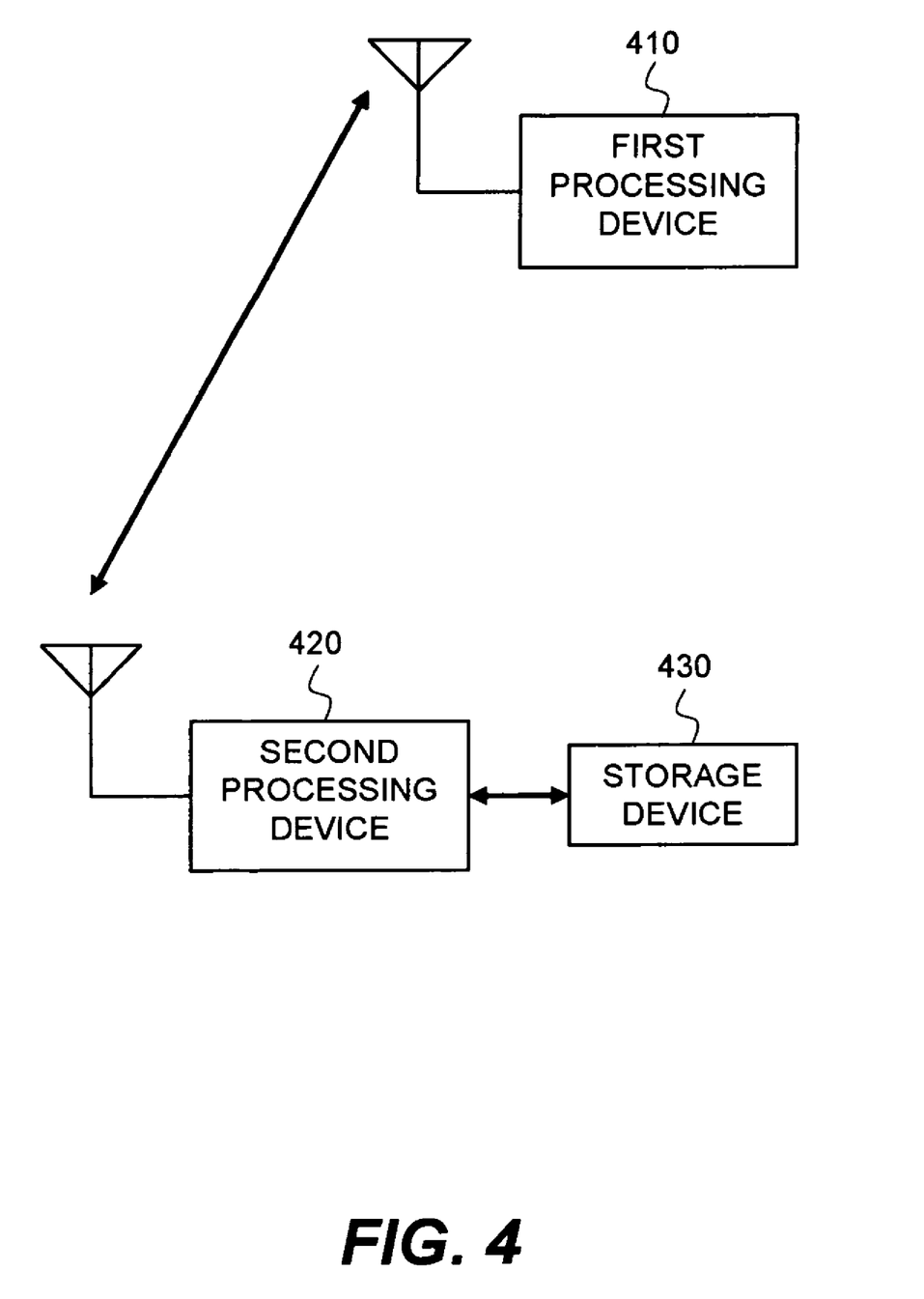
FIG. 4 is a block diagram of a media processing system wherein two processing devices and, connected wirelessly to each other, utilize media files on a removable storage device connected physically to one of the processing devices.

FIG. 4 illustrates a block diagram of a media processing system wherein two media processing devices 410 and 420, connected wirelessly to each other, utilize media files on a removable storage device 430 connected physically to one of the processing devices. In this illustrative application, the first processing device 410 accesses the removable storage device 430 vicariously via the second processing device 420 into which the removable storage device 430 is inserted.

Storage Device Mounting

A cursory review of the steps required to mount a removable storage device 10 and its associated file system are presented here to give the reader a basic understanding in order to appreciate the advantageous aspects of the present invention.

When the processing device 10 is first powered on, it checks for the presence of a removable storage device 20. If present, the processing device first performs a number of miscellaneous tasks such as querying the removable storage device 20 to see what type of device it is (MMC, SD, Microdrive, etc.) and setting it's relative address, operating voltage, transfer speed, data bus width, etc. Identification may include at least the manufacturer and serial number of the storage device. The processing device also determines whether the storage device is write-protected (locked) and sets up any required partial memory protection.

The processing device 10 then reads the boot sector of the at least one memory partition of the storage device 20 to obtain the boot record. The boot record identifies the system name of the manufacturer that formatted the storage device and also contains the bios parameter block (BPB). The BPB identifies the type of file-allocation table (FAT12, FAT16 or FAT32) being used. Pointers are then created to indicate the location of the root directory and FAT tables. The FAT table is then examined to determine the number of free clusters available, where each cluster represents a contiguous portion of memory space comprising a predetermined number of bytes.
File System Mounting Once the storage device 20 has been mounted, and in the absence of a pre-existing file system database structure, the processing device 10 creates an internal database structure that will be used to hold information regarding files contained on the storage device 20. The processing device 10 then searches the root directory of the storage device 20 to determine the folders that are present and may search for the presence of specific folders that are of particular interest to the processing device 10. For example, a portable music player may only be interested in the presence of music files that will normally be saved in a folder entitled: Music or Audio. A DSC may only be interested in the presence of either still or video image files that will normally be saved in a folder entitled: DCIM (Digital Camera Images). The DCIM folder may contain one or more folders having still or video images created by DSCs or DVCs from various manufacturers, following the Design rules for Camera File system (DCF) format. In an exemplary application, the DSC parses each of the DCF folders to determine all of the still or video image files present and populates the previously created database structure accordingly. Any particular processing device 10 may also look for the presence of other folders and files that may contain other data that may be of interest to the particular processing device 10 and may then perform additional operations based on the presence of these folders and files.

EMBODIMENTS OF THE INVENTION

For the sake of simplicity in understanding the invention, the following embodiments will be described in the context of files written to a removable storage device 20. However, other file operations such as deleting, moving or changing the contents of a particular file will also cause a change in a file allocation table (FAT) of the storage device 20 and must therefore be recorded as changes to the contents of the storage device 20 according to the teachings of this invention. Also, there may be storage device commands that alter the contents of control registers within the storage device 20 without affecting any of the files or FAT table entries. The reader will understand that such operations that do not cause a corresponding change to a FAT table entry within the storage device 20 are excluded from the teachings of the present invention.

In a first embodiment of the invention according to FIGS. 1 and 2, a removable storage device 20 includes a register 22 that contains at least a single code that is updated by the storage device controller 21 following each write operation to the storage device 20. However, the invention is not limited to a single code or the code being in register 22, and any suitable code and register can be used. The register 22 comprises a plurality of N-bits located either contiguously or non-contiguously within the non-volatile registers memory space 24 of the storage device controller 21. In this embodiment, the code is an M-bit binary number which is arithmetically changed by the storage device controller 21 following each write operation to the storage device 20, where M is less than or equal to the total number of bits N in the register 22. When the number of write operations exceeds the capacity of the M-bit binary code, the code value either overflows or underflows and the M-bit truncated remainder continues to change arithmetically with each successive write operation to the storage device 20. One such arithmetic method of changing the code value is to simply add or subtract the value '1' to the current value of the code, but other techniques are allowable within the scope of the invention.

Following each write operation to the storage device 20 by the processing device 10 for example, the processing device 10 issues an appropriate command to the storage device 20 to read the contents of the register 22. In the above-referenced SD Specification, this command could be, for example, general command CMD56, which is an optional, vendor-specific command allowed by the SD Specification. In response to this command, the controller 21 of the storage device 20 returns the contents of the register 22 to the processing device 10. The processing device 10 then at least saves the value of the code read from the storage device 20 in a contiguous or non-contiguous location in its own internal non-volatile memory 330 as shown in FIG. 3. This process may be performed either following the writing of each complete file to the storage device 20 or following each of the multiple write operations that may be required to save a single large file to the storage device 20. The processing device's internally cached file system database structure for the storage device 20 is also updated following the completion of each file written to the storage device 20. Just prior to power-off of the processing device 10, or just prior to removal of the storage device 20 from the powered-on processing device 10, the previously cached version of the storage device file system database structure is also retained in a contiguous or non-contiguous location in the processing device's own internal non-volatile memory 330.

Following power-on of the processing device 10, or following insertion of the removable storage device 20 into the powered-on processing device 10, the processing device 10 issues an appropriate command to the storage device 20 to read the contents of the register 22. Again, this command could be, for example, general command CMD56, which is an optional, vendor-specific command allowed by the SD Specification. In response to this command, the controller 21 of the storage device 20 returns the contents of the register 22 to the processing device 10. The processing device 10 then performs at least a comparison between the value of the code read from the storage device 20 and the value of the code that was stored in the processing device's internal non-volatile memory 330 preceding the previous shutdown of the processing device 10 or removal of the removable storage device 20 from the powered-on processing device 10 or following the last write operation to the storage device 20. If the comparison indicates that the codes are equal in value, then no changes took place to the contents of the storage device 20 since the processing device 10 last used it. In this case, the processing device 10 uses the file system database structure that was cached in its own internal non-volatile memory 330 just prior to the previous shutdown of the processing device 10 or removal of the removable storage device 20 from the powered-on processing device 10 or following the last write operation to the storage device 20. The file system for the removable storage device 20 is thus considered to have been mounted instantly by the processing device 10. However, if the comparison indicates that the codes are not equal in value, then changes did take place to the contents of the storage device 20 since the processing device 20 last used it. In this case, the processing device 10 proceeds to create a new file system database structure for the removable storage device 20 according to the procedure described above in the section entitled: File System Mounting.

In a second embodiment of the invention according to FIG. 2, the file system database structure for the removable storage device 20 is saved as a file on the storage device 20 just prior to power-off of the processing device 10 or just prior to removal of the storage device 20 from the powered-on processing device 10. An address pointer to the location of the file on the storage device 20 is also saved in a contiguous or non-contiguous location in the processing device's own internal non-volatile memory 330 along with the associated ID of the storage device 20. After the file is written to the storage device 20 by the processing device 10, the processing device 10 issues an appropriate command to the storage device 20 to read the contents of the register 22. Again, this command could be, for example, general command CMD56, which is an optional, vendor-specific command allowed by the SD Specification. In response to this command, the controller 21 of the storage device 20 returns the contents of the register 22 to the processing device 10. The processing device 10 then at least saves the value of the code read from the storage device 20 in a contiguous or non-contiguous location in its own internal non-volatile memory 330 along with the associated file pointer and storage device ID. In this second embodiment of the invention, the file system database structure that was cached on the storage device 20 is read back by the processing device 10 and used to instantly mount the file system for the storage device 20 following power-on of the processing device 10 or insertion of the storage device 20 into the powered-on processing device 10 in the event that the code values in the storage device 20 and processing device 10 are found to be equal as described in conjunction with the first embodiment of this invention. This embodiment is advantageous in that it does not require the processing device 10 to internally save multiple file systems for the potentially numerous storage devices 20 that may be used with it, thereby eliminating the extra non-volatile memory that would otherwise be required. It also has the advantage of quick access by the processing device 10 to a local copy of the storage device file system but suffers from the potential risk of that file system not being written to the storage device 20 if power to the processing device 10 fails unexpectedly or in the event that the storage device 20 is removed from the processing device 10 without notification.

In an attempt to overcome the shortcoming of the second embodiment, in a third embodiment of the invention, the file system database structure for the storage device 20, is first created according to the procedure described above in the section entitled: File System Mounting. This file system database structure is then immediately saved as a file to the storage device 20 and a local copy is retained in the memory of the processing device along with an address pointer to the location of the associated file on the storage device 20. Each time that a new file is written to the storage device 20 by the processing device 10, the processing device 10 updates both the local copy of the file system as well as the file system file saved on the storage device 20, as well as the address pointer of the file, as necessary.

In a fourth embodiment of the invention, the code value is generated by the controller 21 of the removable storage device 20 using a pseudo-random number generation algorithm and the result is saved in the register 22 of the storage device 20. Use of the code by a processing device 10 then proceeds as described in conjunction with the first, second or third embodiments of this invention.

In a fifth embodiment of the invention, the code value is generated by the controller 21 of the removable storage device 20 using a cyclic redundancy check (CRC) algorithm, based on the contents of at least a portion of the storage device's non-volatile data memory 25, and the result is saved in the register 22 of the storage device 20. Use of the code by a processing device 10 then proceeds as described in conjunction with the first, second or third embodiments of this invention.

In a sixth embodiment of the invention, the M-bit code is stored within an N-bit segment of memory (where M is less than or equal to N) located somewhere, either contiguously on non-contiguously, within the non-volatile data memory section 25 of the storage device 20. Generation and use of the code by a processing device 10 then proceeds as described in conjunction with one or more of the previously described embodiments of this invention.

In a seventh embodiment of the invention, a separate code is maintained and updated for each memory partition and/or memory segment of a storage device 20 that may contain a plurality of memory partitions and/or memory segments. Each of the plurality of separate codes is contained either in its own separate register or memory location or within a common register or memory location as described in conjunction with the previously described embodiments. Generation and use of the codes by a processing device 10 then proceeds as described in conjunction with one or more of the previously described embodiments of this invention.

In an eighth embodiment of the invention, as shown in FIG. 4, a first processing device 410 is wirelessly connected to a second processing device 420 in which the removable storage device 430 is physically located. The wireless connection may be via any of the methods known in the art, including but not limited to RF technologies such as Bluetooth or WiFi as described in the IEEE 802.11 family of standards. In this illustrative application, the first processing device 410 accesses the storage device 430 vicariously via the second processing device 420 into which the storage device 430 is inserted. In a first exemplary application of this embodiment, a digital picture frame (DPF) periodically, and wirelessly, queries a DSC to determine if there are any new images for the DPF to display. In this application the DPF compares the at least one storage device code value that was saved when the last images were transmitted from the DSC to the DPF to the current at least one storage device code value returned by the DSC in response to the query. If the storage device ID and compared codes are the same, then there are no new images to display. However, if one or more of the at least one compared code values are different, then the DPF and DSC engage in a process to determine and enable the new images to be transmitted from the DSC to the DPF.

In a second exemplary application of this embodiment, a digital picture phone communicates wirelessly via a cell phone service provider to an online image service provider such as the Kodak Gallery to upload new images to the user's online account. In this application the online account server compares the at least one storage device code value that was saved when the last images were transmitted from the digital picture phone to the online account to the current at least one storage device code value returned by the digital picture phone in response to a query from the online server. If the storage device ID and compared codes are the same, then there are no new images to upload. However, if one or more of the at least one compared code values are different, then the digital picture phone and online server engage in a process to determine and enable the new images to be transmitted from the digital picture phone to the user's online account.

Compatibility

The foregoing embodiments of the present invention have been described in the context of processing devices 10 and removable storage devices 20 that practice one or more embodiments of the invention. However, it will be clear to those skilled in the art that there may be many processing devices 10 and/or removable storage devices 20 available in the marketplace that do not support the present invention in any of its embodiments. For this reason, the following additional steps can be practiced in conjunction with the above-described embodiments of the invention to ensure compatibility among other devices.

In order to maintain compatibility with other removable storage devices 20 in the marketplace, it is necessary for a processing device 10, which practices one or more of the embodiments of this invention, to first check to ensure that a particular removable storage device 20 also supports one or more of the embodiments of this invention. This is accomplished during power-on of the processing device 10 or insertion of a removable storage device 20 into the powered-on processing device 10, by querying the storage device 20 to determine if its manufacturer code and serial number together identify the storage device 20 as a device that practices one or more embodiments of the present invention. In an exemplary application, where the removable storage device 20 is a Secure Digital (SD) card, as shown functionally in FIG. 2, both the manufacturer code and serial number are contained in the card identification (CID) register 23. If the processing device 10 determines that the storage device 20 does practice one or more of the embodiments of the present invention, then operation of the processing device 10 with such a storage device 20 proceeds as described above in conjunction with one or more of the embodiments of this invention. In such a case, the advantages of instant file system mounting are available. However, if the processing device 10 determines that storage device 20 does not practice one or more of the embodiments of the present invention, then the processing device must create a new file system database structure for the removable storage device 20 according to the procedure described above in the section entitled: File System Mounting.

It is clear that a removable storage device 20 that practices one or more of the embodiments of this invention are compatible with any processing devices 10 that do not practice any aspect of the invention. In such cases, the processing device 10 may simply be unaware of the presence of the one or more unique codes, at least one of which is updated by the storage device controller 21 following a write operation to a particular memory segment of the storage device 20.

Summary

Figure 5:
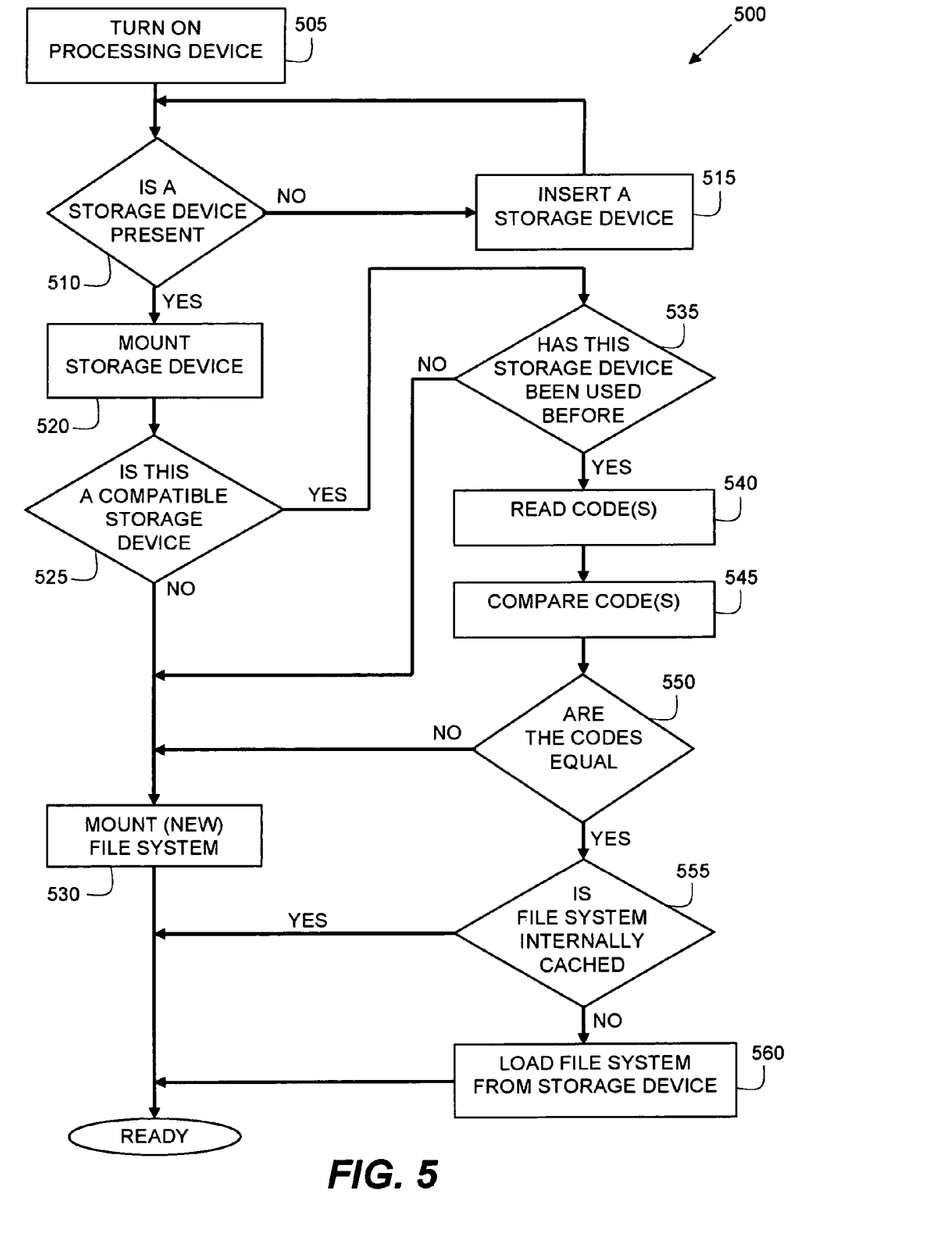
FIG. 5 is a flow chart summarizing the basic steps followed by a processing device to mount the file system following power-on and/or insertion of a removable storage device.

FIG. 5 summarizes the teachings of the present invention in the form of a flow chart 500 illustrating the basic steps followed by a processing device to mount a file system subsequent to power on and/or insertion of a removable storage device. Following power on 505, the processing device checks for the presence of a removable storage device 510. If none is present, the processing device waits for one to be inserted and may perform other user-requested tasks during this time 515. If a storage device is present or is later inserted into the processing device, the processing device proceeds to mount the storage device as described in the foregoing section entitled: Storage Device Mounting 520. Once the storage device is mounted, the processing device determines whether it practices one or more of the embodiments of the present invention 525. If not, the processing device proceeds to create a new file system database structure as described in the foregoing section entitled: File System Mounting 530. However, if the storage device is found to practice one or more embodiments of the present invention, the processing device checks to see whether this storage device has been used with the processing device before. If not, the processing device proceeds to create a new file system database structure as described in the foregoing section entitled: File System Mounting 530. However, if this storage device has been used previously with the processing device, the processing device proceeds to read the one or more code values from the storage device 540 and compares them to the one or more code values saved within the processing device 545. The comparison determines if the codes are equal 550. If one or more of the compared codes are not the same, the processing device proceeds to create a new file system database structure as described in the foregoing section entitled: File System Mounting 530. If the one or more compared codes are the same, the processing device checks to see if the file system database structure is internally cached or not 555. If it is internally cached, it is referenced for immediate use 560 otherwise, the file system database structure is read from the storage device using an internally cached file pointer as reference.

Figure 6:
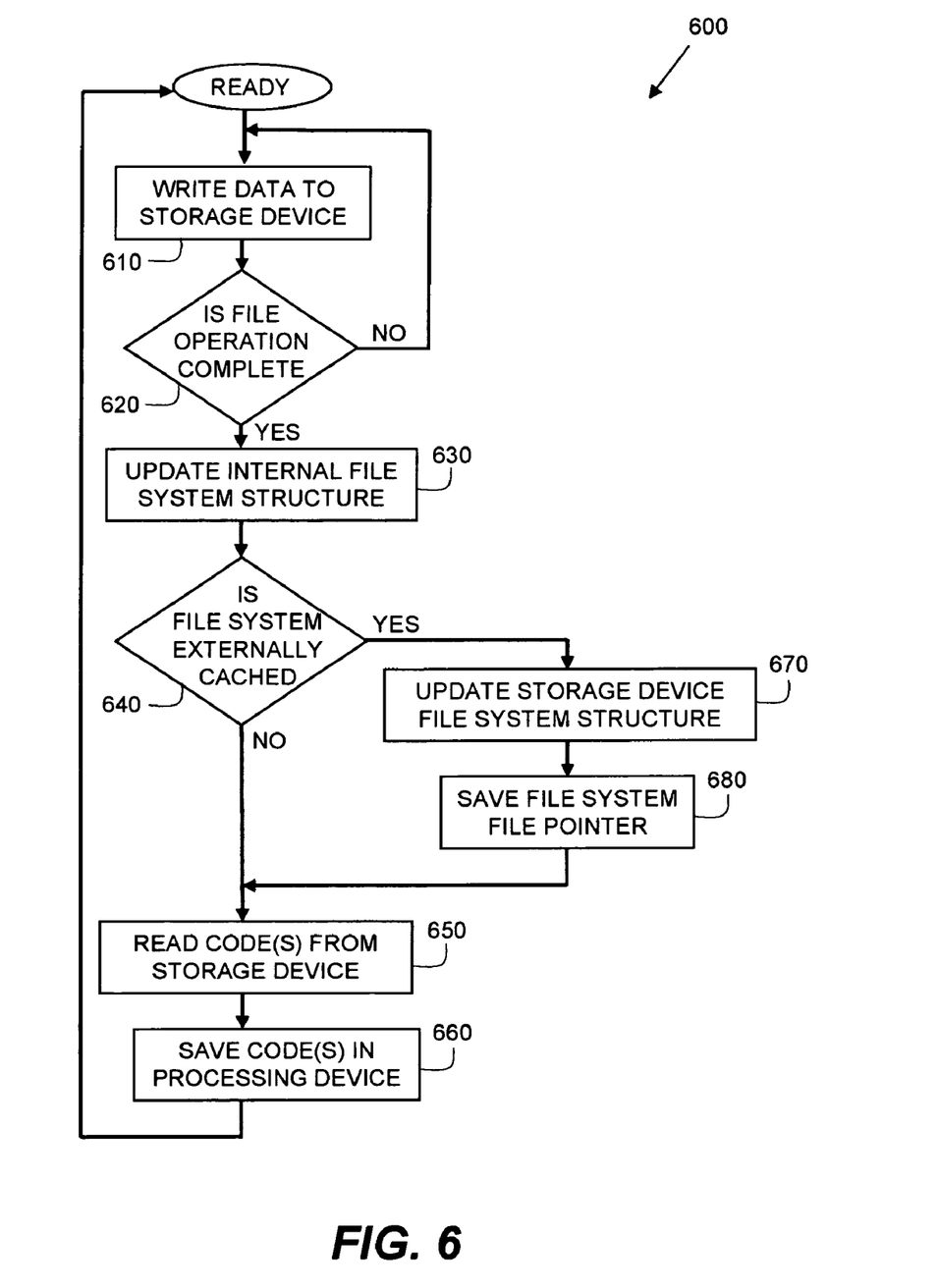
FIG. 6 is a flow chart summarizing the basic steps followed by a processing device to write a file, or a portion of a file, to a removable storage device.

FIG. 6 summarizes the teachings of the present invention in the form of a flow chart 600 illustrating the basic steps followed by a processing device to write a file to the storage device. Following the completion of a write operation to the storage device 610, the processing device checks to see if the file operation is complete 620. If not, the processing device continues to perform write operations to the storage device. Once the file operation is complete, the processing device updates its internally cached file system database structure to reflect the change 630. If there is no externally cached file system database structure, the processing device proceeds to read the code(s) from the storage device 650 and save them in its non-volatile data memory 660. However, if a copy of the file system database structure is also saved on the storage device, the processing device updates the external file system database structure file accordingly 670 and saves an address pointer to the file in its internal non-volatile data memory 680. The processing device then proceeds to read the code(s) from the storage device and save them in its non-volatile data memory.

The present invention has been described in detail with particular reference to certain preferred embodiments thereof, but it will be understood that variations and modifications can be effected within the spirit and scope of the invention. For example, although the invention has been described with particular reference to processing devices that process digital still images, the invention is equally well suited for application in removable storage devices that store other types of media files such as digital videos, documents, GPS maps, music, games, etc. as well as removable storage devices capable of simultaneously storing different media file types. The invention is also applicable for use with processing devices that process these alternate media file types.

PARTS LIST

10 Media Processing Device
10a-1 Media Processing Devices
20 Removable Storage Device
21 Storage Device Controller
22 Write Code Register (WCR) (part of storage device 20)
23 Card Identification Register (CID) (part of storage device 20)
24 Non-volatile Registers (part of storage device 20)
25 Non-volatile Data Memory (part of storage device 20)
300 Digital Still Camera (DSC)
302 Flash Memory
304 Lens
310 CMOS Imager
312 Timing Generator (part of CMOS imager 310)
314 Image Sensor Array (part of CMOS imager 310)
316 A/D Converter (part of CMOS imager 310)
318 DRAM buffer memory
320 Digital Processor
322 Random Access Memory (RAM)
328 Firmware Memory
330 Image/Data Memory
332 Color Display
330 User Controls
350 Wireless Modem
352 Wireless Link
362 Dock Interface
364 Dock/Recharger
370 Wired Link
410 First Processing Device
420 Second Processing Device
430 Removable Storage Device
500 Flow Chart
505 Step
510 Step
515 Step
520 Step
525 Step
530 Step
535 Step
540 Step
545 Step
550 Step
555 Step
560 Step
600 Flow Chart
610 Step
620 Step
630 Step
640 Step
650 Step
660 Step
670 Step
680 Step

What is claimed is:

1. A system for rapid detection of modifications made to content on a removable storage device, comprising: a removable storage device comprising:
(i) a storage device controller within the removable storage device that generates a code value for the content;
(ii) a non-volatile memory of the removable storage device that stores the code value; wherein the storage device controller modifies the code value by an algorithm that creates a unique code value for modified content on the removable storage device which is used to update the code value stored in the non-volatile memory; and
a media processor that reads the code value of the removable storage device, comparing the code value to a previously stored code value in an internal memory of the media processor, and only mounting a pre-established file system directory structure for the removable storage device when the value of the code of the removable storage device equals the value of the previously stored code.

2. The system of claim 1, wherein the code value is saved in one or more existing controller registers spanning either a contiguous or non-contiguous portion of a controller's non-volatile memory space.

3. The system of claim 1, wherein the code value is saved in one or more unique controller registers spanning either a contiguous or non-contiguous portion of a controller's non-volatile memory space.

4. The system of claim 1, wherein the code value is saved in a one or more contiguous or non-contiguous portions of a non-volatile data memory.

5. The system of claim 1, wherein the code value is computed by the storage device controller using a mathematical technique.

6. The system of claim 1, wherein the code value is computed by the storage device controller using a pseudo-random number generation technique.

7. The system of claim 1, wherein the code value is computed by the storage device controller using a cyclic-redundancy check (CRC) based on at least a portion of the contents of the storage device's data memory.

8. The system of claim 1 further comprising a solid-state memory device having an internal controller.

9. The system of claim 8 further comprises at least one memory device selected from a group consisting of Secure Digital (SD) card, MultiMediaCard (MMC), Compactflash (CF) card, Memory Stick, and USB Flash drive.

10. The system of claim 1, further comprises a rotating storage media and having an internal controller.

11. The system of claim 10, wherein the rotating storage device is a hard disk drive (HDD).

12. The system of claim 10, wherein the rotating storage device is an optical disk drive.

13. The system of claim 1, wherein the media processor is selected from a group consisting of a digital video camera, personal computer (PC), personal digital assistant (PDA), printer, television, digital picture frame, cell phone, portable media player, gaming device, kiosk, and global positioning system (GPS) device.

14. The system of claim 1, wherein the file system directory structure is saved in a non-volatile portion of an internal memory of the media processor.

15. The system of claim 1, wherein the file system directory structure is saved in the removable storage device.

16. The system of claim 1, wherein the code value is a plurality of codes.

17. A method for rapidly detecting modifications to content on a removable storage device, the method comprising the steps of:

generating a code value for the content by a storage device controller disposed on the removable storage device;

storing the code value in non-volatile memory on the removable storage device;

creating a unique code value for modified content by an algorithm on the removable storage device which unique code value is used to update the code value stored in the non-volatile memory;

reading the code value from the removable storage device by a media processor and comparing the code value to a previously stored code value in a memory of the media processor for indicating that a modification was made to content on the removable storage device; and only mounting a pre-established file system directory structure for the removable storage device when the value of the code of the removable storage device equals the value of the previously stored code.

18. The method of claim 17 further comprising saving the code value in one or more existing controller registers spanning either a contiguous or non-contiguous portion of a controller's non-volatile memory space.

19. The method of claim 17 further comprising saving the code value in one or more unique controller registers spanning either a contiguous or non-contiguous portion of a controller's non-volatile memory space.

20. The method of claim 17 further comprising saving the code value in a one or more contiguous or non-contiguous portions of a non-volatile data memory.

21. The method of claim 17 further comprising computing the code value by the storage device controller using a mathematical technique.

22. The method of claim 17 further comprising computing the code value by the storage device controller using a pseudo-random number generation technique.

23. The method of claim 17 further comprising computing the code value by the storage device controller using a cyclic-redundancy check (CRC) based on at least a portion of the contents of the storage device's data memory.

24. The method of claim 17 further comprising providing a solid-state memory device having an internal controller.

25. The method of claim 24 further comprises providing at least one memory device selected from a group consisting of Secure Digital (SD) card, MultiMediaCard (MMC), Compactflash (CF) card, Memory Stick, and USB Flash drive.

26. The method of claim 17 further comprising saving the file system directory structure is saved in a non-volatile portion of an internal memory of the media processor.

27. The method of claim 17 further comprising saving the file system directory structure in the removable storage device.

28. The method of claim 17, wherein reading a code value further comprises reading the code value from the removable storage device following the powering-on of the media processor.

29. The method of claim 17, wherein reading the code value further comprises reading the code value upon insertion of the removable storage device into a powered-on processing device.

* * * * *